(Model.)

A. C. EVANS.
CORN PLANTER.

No. 257,156. Patented May 2, 1882.

Attest.
M. M. Converse
Ora Converse

Inventor.
Austin C Evans
B. C. Converse, Atty.

UNITED STATES PATENT OFFICE.

AUSTIN C. EVANS, OF SPRINGFIELD, OHIO.

CORN-PLANTER.

SPECIFICATION forming part of Letters Patent No. 257,156, dated May 2, 1882.

Application filed May 28, 1881. (Model.)

*To all whom it may concern:*

Be it known that I, AUSTIN C. EVANS, of the city of Springfield, in the county of Clarke and State of Ohio, have invented a new and useful Improvement in Corn-Planters, which is set forth in the following specification.

This invention, which is an improvement on my patent of May 10, 1881, No. 241,129, relates to a corn or seed planter in which a rotary seed-disk is used having teeth extending radially from its periphery; and it consists, first, in the peculiar shape of said teeth, whereby they are adapted to be released with but little or no friction from the driving-pawls, which are pivoted upon the top of an oblong frame rigidly attached to the slide-lever, and which pass over them as the seed-disk is rotated.

Excessive friction, which produces unusual wear in the mechanism by which the rotary seed-disks are actuated in most corn-planters of this class, is a serious obstacle, and the efforts of inventors have been directed toward overcoming this difficulty without entire success.

The object of my invention is the production of a driving or actuating mechanism on the slide-lever, which is certain and effective, which cannot be clogged or bound at a partial stroke of the lever, and which is operated with the least possible friction.

Figure 1:
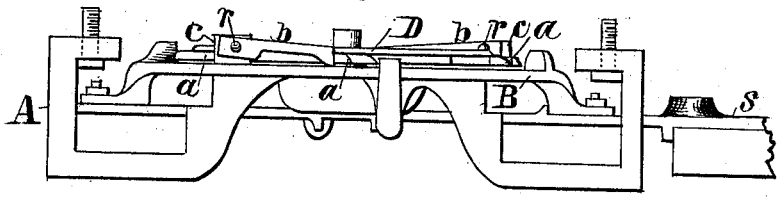
Figure 2:
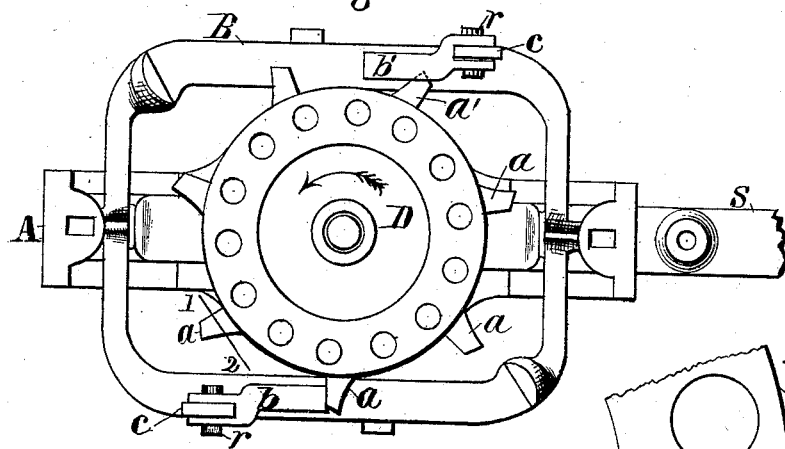
Figure 5:
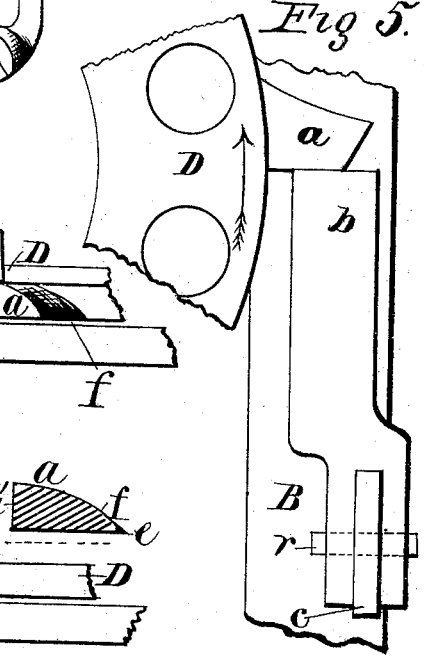
Figure 3:
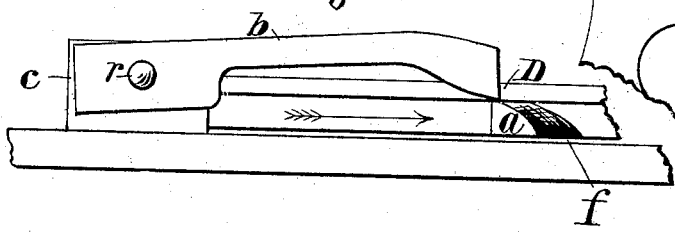
Figure 4:
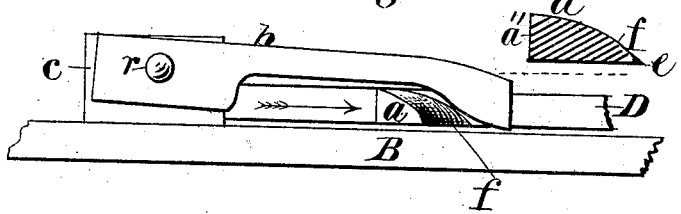

Figure 1 is a side elevation of the iron frame which supports a rotary seed-disk at one end of the slide-lever of a corn-planter to which my improvements are applied. Fig. 2 is a top view of the same. Fig. 3 is an enlarged view of a section of the seed-disk, a portion of the driving-frame, and the driving-pawl pivoted thereto, as the latter is about to drop behind the tooth of the disk after having passed over it. Fig. 4 is a similar view of the parts shown in Fig. 3 in different position, the pivoted pawl being about to be elevated by the passing of the tooth seen under it as the disk is rotated from left to right. Fig. 5 is a plan view of the parts shown in Figs. 3 and 4.

In Figs. 1 and 2, A is the supporting-frame, of cast-iron, (which in this case is shown detached from the main cross-bar of a corn-planter,) on which the seed-disk D is pivoted.

B is an oblong round-cornered cast frame, which is rigidly attached by bolts through lugs extending centrally from its end bars to the slide-bar S. The side bars of this frame operate in a plane directly under the teeth of the disk D, the latter passing their full length over the side bars as the disk is rotated. The arrows show the direction of rotation, which is from left to right. On the top of the side bars, on either side, is pivoted a vertically-falling pawl, $b$, to an upright lug, $c$, cast on the top of the frame B, near the rear corner of each driving side. To bring this pawl into position for driving, as shown on the lower side bar, Fig. 2, and in the enlarged view, Fig. 5, it must first pass over the tooth $a$ of disk D, on either side, as the latter is rotated first by one pawl and then by the other at each stroke of the lever S. To allow the pawl to pass over the tooth with the least possible friction, the rear end of the former is pivoted high enough upon the post or lug $c$ to leave a clear opening under it for the passage of the tooth until it reaches the point where the pawl rests upon the side bar. To facilitate the easy passage of the tooth of the disk under the point of the pawl in elevating it, the top is sloped or beveled from the rear to the front edge, giving its cross-section a triangular or chisel-pointed shape, as seen in Figs. 3 and 4, which also shows the tooth as tapering from base to point. A cross-section in the latter figure shows the shape of the tooth as bisected through line 1 2, Fig. 2, $a''$ being the rear and $e$ the front edge of the tooth $a$, and $f$ the beveled or inclined face.

By reference to Fig. 2 it will be noticed that as the slide-lever is thrown from left to right the lower pawl, $b$, drives the tooth $a$ forward, the disk turning in the direction of the arrow, and at the same time the upper tooth, $a'$, is passing under the pawl $b'$, meeting with no resistance until it reaches the point of it, when its sloping front edge carries it easily under the point of the pawl, as seen in the view Fig. 3, until the latter falls behind the tooth, when, as the motion of the lever is reversed, $b'$ now becomes in turn the driving-pawl, driving disk D from the opposite side. The cross-sectional view and the two views enlarged, Figs. 3 and 4, show the difference between this disk-tooth and that shown in my patent of May 10, 1881. The bevel-points are the same, as are also the raised stops seen upon the driving-frame B. The points of the pawls are made heavy, so that they will fall quickly by their own gravity the instant the tooth of the disk is released, making their action certain in the use of the planter upon undulating or level ground.

I am aware that rotary seed-dropping devices have been constructed with perforated seed-disk operated by separate toothed wheel and pawl, and also having a perforated and toothed disk operated by stops on an oscillating frame rising into engagement therewith, and I therefore do not claim such construction.

What I claim, and desire to secure by Letters Patent, is—

The oblong sliding frame B, operated by bar S, and provided with pawls $b\,b$, in combination with the perforated seed-disk D, formed with the teeth $a$, tapering from base to point, extending radially therefrom, said teeth being beveled from their rear to their front edge to give easy rise to actuating-pawls $b\,b$, as shown and described.

AUSTIN C. EVANS.

Attest:
   R. A. PIERCE,
   B. C. CONVERSE.